April 2, 1946.　　　　　P. ORR　　　　　2,397,620
TRANSMISSION
Original Filed Sept. 2, 1942
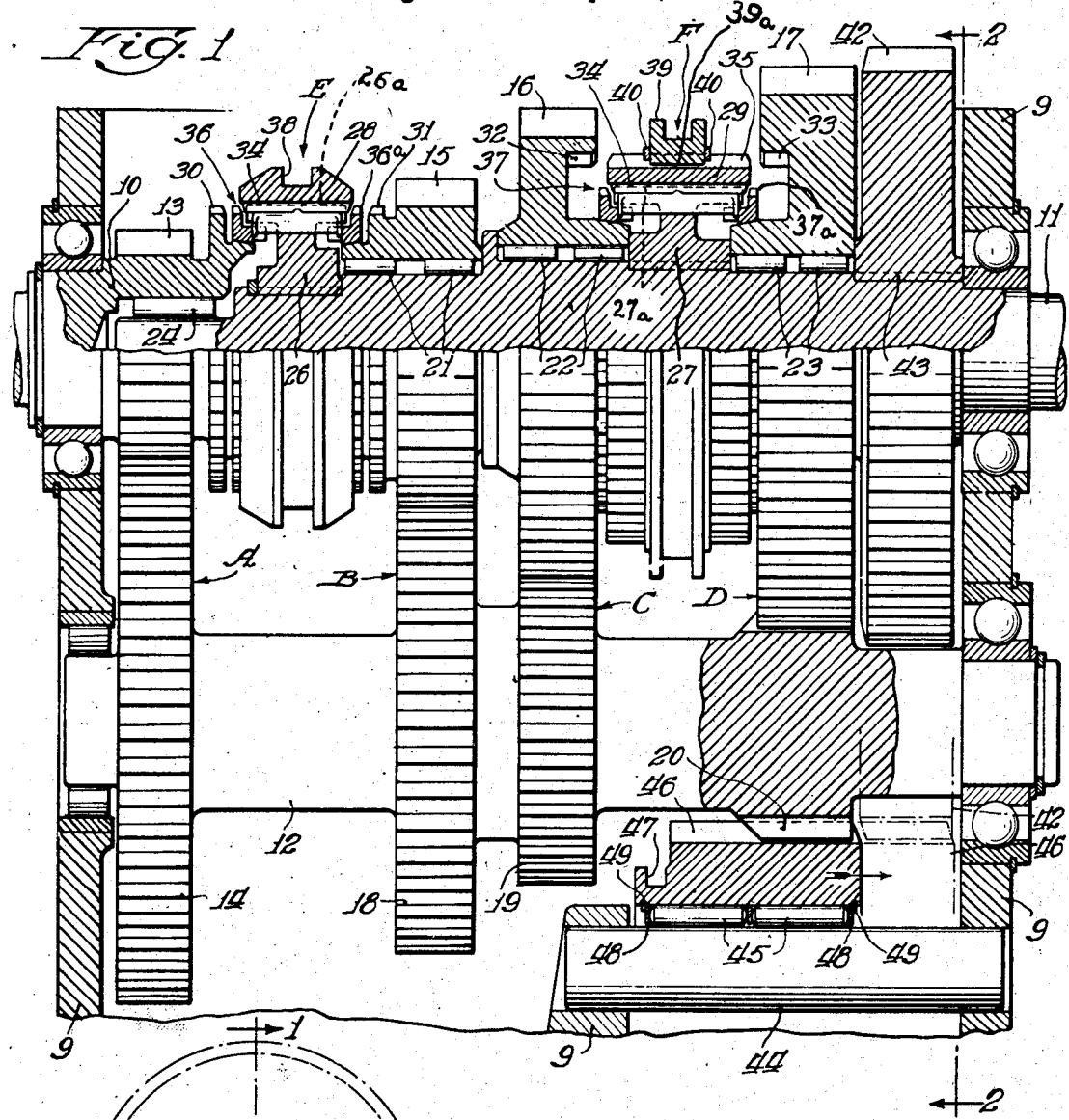
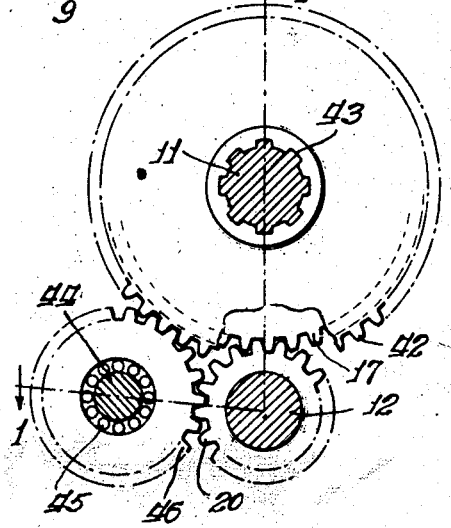
Inventor:
Palmer Orr Patented Apr. 2, 1946

2,397,620

UNITED STATES PATENT OFFICE 2,397,620

TRANSMISSION

Palmer Orr, Muncie, Ind., assignor to Borg-Warner Corporation, Chicago, Ill., a corporation of Illinois Original application September 2, 1942, Serial No. 456,972. Divided and this application August 19, 1944, Serial No. 550,205

13 Claims. (Cl. 192—53)

This application is a division of my copending application filed September 2, 1942, Serial No. 456,972, for a transmission.

This invention relates to clutching mechanism and has as its general object the provision of a rugged clutch construction which is inexpensive to manufacture and easy to assemble.

A further object of my invention is the provision of clutching mechanism having a sleeve member shiftable in opposite directions and so constructed as to permit selective clutch engagement in a minimum of space.

A more particular object of my invention consists of the formation of said sleeve member of the clutching mechanism with internal and external teeth, and the employment with it of a structurally independent shifting member secured about said sleeve and held against relative axial motion or relative rotational motion with respect to the sleeve by means coacting with the external teeth on said sleeve member.

Other objects, the advantages and uses of the invention will become more apparent after reading the following specification and claims, and after consideration of the drawing forming a part of the specification wherein:

Fig. 1 is a side elevation, partially in section, of a transmission mechanism employing my invention, taken as indicated by the line 1—1 of Fig. 2; and Fig. 2 is a transverse sectional view of the same taken as indicated by the line 2—2 of Fig. 1.

As an example of one use to which my invention may be put I have shown it, in the accompanying drawing, employed in a four-speed transmission adapted for use in motor trucks, comprising generally a housing 9, a drive shaft 10, a driven shaft 11, and a countershaft 12 journalled therein, a first train of gears A for providing a drive from the drive shaft 10 to the countershaft 12, and second, third and final gear trains B, C and D respectively for providing drives of varying ratios from the countershaft to the driven shaft 11.

The gear train A includes a pinion 13 fixed to the drive shaft 10 and a gear 14 fixed to the countershaft 12 and meshing with the pinion 13. The gear trains B, C and D include a pinion 15 and gears 16 and 17 journalled upon the driven shaft 11 and meshing respectively with a gear 18 and pinions 19 and 20 fixed to the countershaft 12. Bearings 21, 22 and 23 respectively are interposed between the pinion 15 and gears 16 and 17 and the driven shaft 11. The forward end of the driven shaft 11 is piloted as at 24 in the rear end of the drive shaft 10.

For establishing the various forward drives, I provide a pair of two-way clutch mechanisms E and F respectively, comprising hub members 26, 27 respectively, splined to the driven shaft 11, slidable clutch sleeves 28, 29 respectively, drivingly connected to and axially slidable on the rims of the hub members 26, 27, and jaw clutch teeth 30, 31, 32 and 33 respectively, fixed to the pinions 15 and 15 and gears 16 and 17 respectively, and adapted to be engaged by the clutch teeth 34 and 35 of the shiftable jaw clutch sleeves 28, 29 respectively. The internal teeth 34 of each sleeve mesh with corresponding external teeth 26a, 27a on the respective hub members 26, 27 in order to provide the above-mentioned slidable driving engagement between the sleeves and the hub members.

Between the shiftable jaw clutch sleeves 28 and 29 respectively, I interpose synchronizing mechanism of the type shown in U. S. Patent No. 2,221,900, issued November 19, 1940, in the name of S. O. White and Bruce Barr. Such mechanisms which are indicated generally at 36 and 37 respectively, have teeth 36a and 37a, and function to synchronize the jaw clutch sleeves 28, 29 with the members into which they are being moved into engagement, just prior to such engagement.

For shifting the clutch sleeve 28 there is employed a groove 38 in the periphery of said sleeve. For shifting the clutch sleeve 29 my invention provides a channeled ring 39 having internal teeth 39a meshing with the teeth 35 of the sleeve 29, which ring is secured against axial movement along the periphery of the sleeve 29 by snap rings 40. A clutch sleeve of such construction is far less expensive to manufacture than a clutch sleeve formed with an integral shifting member comparable to ring 39, since the external teeth 35 of sleeve 29 may be formed in a simple external gear hobbing operation, the channeled ring 39 being attached subsequently. A further advantage of my invention consists of decreasing the distance needed between the gears 16 and 17 which are positioned axially on either side of clutch F. This advantage is made possible by forming clutch teeth 32 and 33 internally of the gears 16 and 17, respectively, and having them engage with the external teeth 35 on the sleeve 29.

Between the rear wall of the housing 9 and the final gear train D, I interpose a reverse gear 42 which is splined as at 43 to the driven shaft 11. Mounted in the frame 9 is a short idler shaft 44 on which is journalled, through the medium of bearings 45, a reversing idler 46 which is constantly in mesh with the pinion 20 of the final gear train D and is of sufficient length to remain in mesh therewith while being slid axially into mesh with the reverse gear 42. This latter position is indicated in dotted lines in Fig. 1.

The reversing idler 46 is provided with a groove 47 adapted to receive a shift fork by means of which the idler may be shifted axially on the shaft 44.

The bearing rollers 45 are retained within the bore of the idler 46 by retaining washers 48 which in turn are retained by snap rings 49 seated in internal grooves in the idler 46. Thus as the idler is shifted axially the bearings 45 will be carried along with it, sliding upon the shaft 44.

In the operation of the transmission, drive is transmitted from the drive shaft 10 to the countershaft 12 through the pinion 13 and gear 14 of the first gear train A. Low gear is obtained by shifting clutch sleeve 28 into neutral and the clutch sleeve 29 into engagement with the clutch teeth 33 so as to connect the final gear train D to the driven shaft 11. In a similar manner, second gear is obtained by leaving clutch sleeve 28 in neutral and shifting the sleeve 29 into engagement with the clutch teeth 32 so as to connect in the gear train C. Third speed forward is obtained by shifting clutch sleeve 29 into neutral and the clutch sleeve 28 into engagement with the teeth 31 so as to connect in the gear train B. Direct drive is obtained by leaving clutch sleeve 29 in neutral and shifting the clutch sleeve 28 into engagement with the clutch teeth 30 of the drive shaft.

Reverse drive is obtained by shifting each of the clutch sleeves 28 and 29 to neutral position and thereafter shifting the reverse idler 46 into engagement with the reverse gear 42. Any conventional shifting linkage whereby this sequence of shifting operations may be obtained, may be employed for this purpose.

While I have described my invention in connection with one specific embodiment thereof it is to be understood that this is by way of illustration and not by way of limitation and the scope of my invention is defined solely by the appended claims which should be construed as broadly as the prior art will permit.

I claim:

1. In a transmission, a shaft, a pair of axially spaced gears journaled thereon, said gears having recessed internal clutch teeth, a hub fixed to said shaft between said gears, said hub having peripheral teeth, a jaw clutch sleeve having internal teeth meshing with said peripheral teeth and having external teeth, the end portions of which external teeth are adapted to mesh with said recessed teeth, a structurally independent channel ring encircling said sleeve, and means coacting with the external teeth on said sleeve securing said channel ring against axial displacement on said sleeve and for locking said channel ring and sleeve against relative rotation.

2. A transmission as defined in claim 1, including synchronizer rings interposed between said hub and said gears, said synchronizer rings having external blocker teeth adapted to coact with the internal teeth of said sleeve for blocking advance of the sleeve to clutching engagement with said recessed teeth as long as differential rotation exists between the members to be clutched.

3. In a transmission, a shaft, a pair of axially spaced gears journaled thereon, said gears having recessed internal clutch teeth, a hub fixed to said shaft between said gears, said hub having peripheral teeth, a jaw clutch sleeve having internal teeth meshing with said peripheral teeth, external teeth extending the length of said sleeve, the end portions of which external teeth are adapted to mesh with said recessed teeth, a structurally independent channel ring encircling said sleeve, means projecting from said ring and engaged between the external teeth on said sleeve, and snap rings seated in recesses in the external teeth on said sleeve for securing said channel ring against axial displacement on said sleeve.

4. A transmission as defined in claim 3, including synchronizer rings interposed between said hub and said gears, said rings having external blocker teeth adapted to coact with the internal teeth of said sleeve for blocking advance of the sleeve to clutching engagement with said recessed teeth as long as differential rotation exists between the members to be clutched.

5. In a transmission, a shaft, a pair of axially spaced gears journaled thereon, said gears having recessed internal clutch teeth, a hub fixed to said shaft between said gears, said hub having peripheral teeth, a jaw clutch sleeve having internal teeth meshing with said peripheral teeth and having external teeth, the end portions of which external teeth are adapted to mesh with said recessed teeth, a structurally independent channel ring encircling said sleeve and having internal teeth meshing with the central portions of said external teeth on said sleeve, and means securing said channel ring against axial displacement on said sleeve.

6. A transmission as defined in claim 5, including synchronizer rings interposed between said hub and said gears, said synchronizer rings having external blocker teeth adapted to coact with the internal teeth of said sleeve for blocking advance of the sleeve to clutching engagement with said recessed teeth as long as differential rotation exists between the members to be clutched.

7. In combination, a shaft, a toothed gear freely rotatable with respect to said shaft, a clutch sleeve supported about said shaft for rotation therewith, said clutch sleeve being axially slidable with respect to said shaft and having external teeth extending the length of said sleeve, said external teeth being adapted to mesh with the teeth of said gear, and a structurally independent shifting means encircling said sleeve and secured thereto against relative axial movement and relative rotational movement.

8. The combination of claim 7, including synchronizing means adapted to block advance of the clutch sleeve to clutching engagement with the teeth of said gear as long as said sleeve and gear are rotating at different speeds.

9. In combination, a shaft, a toothed gear freely rotatable with respect to said shaft, a clutch sleeve supported about said shaft for rotation therewith, said clutch sleeve being axially slidable with respect to said shaft and having external teeth adapted to mesh with the teeth of said gear, and a structurally independent shifting means encircling said sleeve and secured thereto against relative axial movement and relative rotational movement by means coacting with the external teeth on said sleeve.

10. In combination, a shaft, a toothed gear freely rotatable with respect to said shaft, a clutch sleeve supported about said shaft for rotation therewith, said clutch sleeve being axially slidable with respect to said shaft and having external teeth adapted to mesh with the teeth of said gear, a structurally independent shifting means encircling said sleeve, means projecting from said shifting means and engaging with the external teeth on said sleeve, and means securing said shifting means against axial displacement on said sleeve.

11. In combination, a shaft, a toothed gear freely rotatable with respect to said shaft, a clutch sleeve supported about said shaft for rotation therewith, said clutch sleeve being axially slidable with respect to said shaft and having external teeth extending the length of said sleeve, said external teeth being adapted to mesh with the teeth of said gear, a structurally independent shifting means having internal teeth meshing with the central portions of said external teeth on the sleeve, and snap rings seated in recesses in the external teeth on said sleeve for securing said shifting means against axial displacement on said sleeve.

12. In combination, a shaft, a gear freely rotatable with respect to said shaft and having internal clutch teeth, a hub fixed to said shaft for rotation therewith, said hub having peripheral teeth, a clutch sleeve having internal teeth meshing with said peripheral teeth and having external teeth which are adapted to mesh with the internal teeth of said gear, and a structurally independent channel ring encircling said sleeve and secured against relative axial movement or relative rotational movement with respect to said sleeve by means coacting with the external teeth on said sleeve.

13. In combination, a shaft, a pair of axially spaced gears freely rotatable with respect to said shaft, said gears having internal clutch teeth, a hub fixed to said shaft and spacing said gears, said hub having peripheral teeth, a clutch sleeve having internal teeth meshing with said peripheral teeth of the hub and having external teeth adapted to mesh with said internal clutch teeth, a structurally independent shifting member encircling said sleeve, means projecting from said shifting member and engaged with the external teeth on said sleeve, and means securing said shifting member against axial displacement on said sleeve.

PALMER ORR.